US012053132B2

(12) United States Patent
Luyckx

(10) Patent No.: US 12,053,132 B2
(45) Date of Patent: Aug. 6, 2024

(54) SURFACE CLEANING APPARATUS WITH TASK LIGHTING

(71) Applicant: BISSELL Inc., Grand Rapids, MI (US)

(72) Inventor: Michael Luyckx, Ada, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 18/115,817

(22) Filed: Mar. 1, 2023

(65) Prior Publication Data

US 2023/0200612 A1 Jun. 29, 2023

Related U.S. Application Data

(63) Continuation of application No. 17/098,543, filed on Nov. 16, 2020, now Pat. No. 11,617,486.

(60) Provisional application No. 62/939,830, filed on Nov. 25, 2019.

(51) Int. Cl.

| | |
|---|---|
| ***A47L 11/40*** | (2006.01) |
| ***A47L 11/30*** | (2006.01) |
| ***F21V 23/04*** | (2006.01) |
| ***F21V 23/06*** | (2006.01) |
| ***F21V 33/00*** | (2006.01) |
| ***F21Y 115/10*** | (2016.01) |

(52) U.S. Cl.

CPC ........... *A47L 11/4008* (2013.01); *A47L 11/30* (2013.01); *A47L 11/4016* (2013.01); *F21V 23/04* (2013.01); *F21V 23/0492* (2013.01); *F21V 23/06* (2013.01); *F21V 33/0044* (2013.01); *F21Y 2115/10* (2016.08)

(58) Field of Classification Search

CPC .. A47L 11/4008; A47L 11/30; A47L 11/4016; A47L 11/4002; A47L 11/4044; A47L 11/34; A47L 5/36; A47L 9/00; A47L 9/02; A47L 9/30; A47L 11/32; A47L 11/4013; A47L 11/4038; A47L 11/405; A47L 11/4083; A47L 11/4088; F21V 23/04; F21V 23/0492; F21V 23/06; F21V 33/0044; F21Y 2115/10

See application file for complete search history.

(56) References Cited

U.S. PATENT DOCUMENTS

| | | | |
|---|---|---|---|
| 4,757,574 | A | 7/1988 | Sumerau |
| 4,791,700 | A | 12/1988 | Bigley et al. |
| 5,207,498 | A | 5/1993 | Lawrence et al. |
| 5,219,446 | A | 6/1993 | Klepac |
| 5,467,501 | A | 11/1995 | Sepke |
| 5,896,618 | A | 4/1999 | Woo et al. |
| 6,968,593 | B1 | 11/2005 | Lenkiewicz et al. |
| 9,398,836 | B2 | 7/2016 | Luedke et al. |
| 9,474,424 | B2 | 10/2016 | Moyher, Jr. et al. |

(Continued)

FOREIGN PATENT DOCUMENTS

| | | |
|---|---|---|
| CA | 2948056 | 12/2015 |
| EP | 2978353 | 2/2016 |

(Continued)

*Primary Examiner* — David Redding

(74) *Attorney, Agent, or Firm* — Warner Norcross + Judd LLP

(57) ABSTRACT

The present disclosure provides a surface cleaning apparatus that includes task lighting. The task lighting can be provided on a hand-carried body or housing of the surface cleaning apparatus. Power to the task lighting can be controlled by a switch. The task lighting can be adjustable relative to the hand-carried body, and can be directed to illuminate a desired location.

20 Claims, 15 Drawing Sheets

(56) References Cited

U.S. PATENT DOCUMENTS

| | | | |
|---|---|---|---|
| 9,594,204 | B2 | 3/2017 | Sakaguchi et al. |
| 9,888,821 | B2 | 2/2018 | Scholten et al. |
| 9,924,842 | B2 | 3/2018 | Gu et al. |
| 9,946,008 | B2 | 4/2018 | Fukui et al. |
| 10,092,155 | B2 | 10/2018 | Xia et al. |
| 2006/0096057 | A1 | 5/2006 | Chatfield |
| 2008/0127447 | A1 | 6/2008 | Overaag |
| 2012/0062713 | A1 | 3/2012 | Flinsenberg et al. |
| 2013/0318741 | A1 | 12/2013 | Moyher, Jr. et al. |
| 2015/0108244 | A1 | 4/2015 | Pruiett et al. |
| 2016/0037989 | A1 | 2/2016 | Theising et al. |
| 2016/0066757 | A1 | 3/2016 | Conrad et al. |
| 2017/0164801 | A1 | 6/2017 | Moyher, Jr. et al. |
| 2019/0269291 | A1 | 9/2019 | Royale |
| 2019/0387936 | A1 | 12/2019 | Richey et al. |

FOREIGN PATENT DOCUMENTS

| | | |
|---|---|---|
| JP | 2016107133 | 6/2016 |
| KR | 101852827 | 4/2018 |

SURFACE CLEANING APPARATUS WITH TASK LIGHTING

CROSS-REFERENCE TO RELATED APPLICATION(S)

The present application is a continuation of U.S. patent application Ser. No. 17/098,543, filed Nov. 16, 2020, which claims the benefit of U.S. Provisional Application No. 62/939,830, filed Nov. 25, 2019, both of which are incorporated herein by reference in their entirety.

BACKGROUND

Extractors are well-known surface cleaning devices for deep cleaning carpets and other fabric surfaces, such as upholstery. Most extractors comprise a fluid delivery system and a fluid recovery system. The fluid delivery system typically includes one or more fluid supply tanks for storing a supply of cleaning fluid, a fluid distributor for applying the cleaning fluid to the surface to be cleaned, and a fluid supply conduit for delivering the cleaning fluid from the fluid supply tank to the fluid distributor. The fluid recovery system usually comprises a recovery tank, a nozzle adjacent the surface to be cleaned and in fluid communication with the recovery tank through a conduit, and a source of suction in fluid communication with the conduit to draw the cleaning fluid from the surface to be cleaned and through the nozzle and the conduit to the recovery tank. Other wet cleaning apparatuses include steam cleaners that dispense steam, and spot cleaners that may dispense liquid and scrub the surface, but do not recover liquid. Extractors and other wet cleaners can be adapted to be hand-carried by a user, and in some cases include a hose coupled with a tool carrying the fluid distributor and nozzle.

Viewing spots and stains on a surface to be cleaned has often presented a problem. Dimly lit or confined areas can be difficult to clean with conventional surface cleaning devices. Various illuminated surface cleaning devices have been proposed to improve the cleaning in the areas described. Although effective in illuminating the surface to be cleaned, current illuminated surface cleaning devices are still lacking, as they can obstruct user line of sight, which can impact the ability of the user to effectively clean the surface, or offer only limited control over the illumination.

SUMMARY OF INVENTION

A surface cleaning apparatus with task lighting is provided herein.

According to one embodiment, the apparatus includes a hand-carried body adapted to be hand carried by a user, the hand-carried body having a main housing, a motor/fan assembly, a supply tank, and a recovery tank, a flexible hose mounted to the hand-carried body, a hand-held cleaning tool mounted to an end of the hose, and a task light on the hand-carried body, the task light emitting visible light outwardly from the hand-carried body toward a location adjacent to the hand-carried body.

In one of its aspects, the cleaning apparatus comprises adjustable task lighting that can be directed toward a desired location, rather than being fixed and non-adjustable relative to the apparatus.

In certain embodiments, the surface cleaning apparatus is a portable extraction cleaner or portable deep cleaner adapted to be hand carried by a user to carpeted areas of cleaning relatively small areas, such as small rugs and upholstery. The task lighting can be provided on a hand-carried body of the portable extraction cleaner, on a hand tool of the portable extraction cleaner, or both.

According to another embodiment, a portable extraction cleaner includes a main housing comprising a partition mounted, optionally centrally, on a housing base, and a motor/fan assembly mounted within the partition. A supply tank for cleaning solution is removably mounted to the main housing at one side of the partition and a recovery tank is mounted to the main housing on another side of the partition. A task light is provided on the partition, between the supply and recovery tanks.

In certain embodiments, a carry handle can be formed on an upper portion of the partition. The extraction cleaner is well balanced for carrying, with the motor/fan assembly and task light positioned below the carry handle, with the supply and recovery tanks flanking these components.

In yet another embodiment, the task light can pivot between a stored position and an angled position. In the stored position, the task light is retracted against the partition for compact storage. In the angled position, the task light is extended away from the partition to angle the task light outwardly from the extraction cleaner. In the angled position, light emitted from the task light is directed at a downward angle, outwardly from the main housing.

According to still another embodiment, a portable extraction cleaner includes a housing, a suction motor, a supply tank removably mounted to the housing, and a recovery tank removably mounted the housing. A task light is provided on the housing, and is adjustable to change the direction in which light is emitted relative to the extraction cleaner.

In a further embodiment, the task light is an adjustable snake light comprising a flexible arm coupled with the housing at a proximal end thereof, and at least one light source supported at a distal end of the flexible arm.

According to yet another embodiment, a surface cleaning apparatus for cleaning a surface comprises a housing, a fluid delivery system having a supply tank on the housing for storing cleaning fluid, and a fluid distributor for delivering the cleaning fluid from the supply tank to the surface. A task light is provided on the housing, or on a hand-held cleaning tool coupled with the housing.

The embodiments of a surface cleaning apparatus with task lighting disclosed herein enable a better cleaning experience. The use of a task light that can be focused exactly where a user needs illumination provides a better spot and stain cleaning experience. Using the task light, a user can easily find stains, spots, or debris on the surface, even a dimly lit location or confined area.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as “at least one of X, Y and Z” is meant to include any one of X, Y or Z individually, and any combination of X, Y and Z, for example, X, Y, Z; X, Y; X, Z; and Y, Z.

DESCRIPTION OF EMBODIMENTS

The disclosure generally relates to a surface cleaning apparatus with task lighting. Aspects of the disclosure described herein relate to a surface cleaning apparatus that delivers cleaning fluid to a surface to be cleaned, such as extraction cleaner that also extracts cleaning fluid and debris from the surface. Aspects of the disclosure described herein are further related to a portable extraction cleaner that is adapted to be hand carried by a user to carpeted areas for cleaning relatively small areas.

Figure 1:
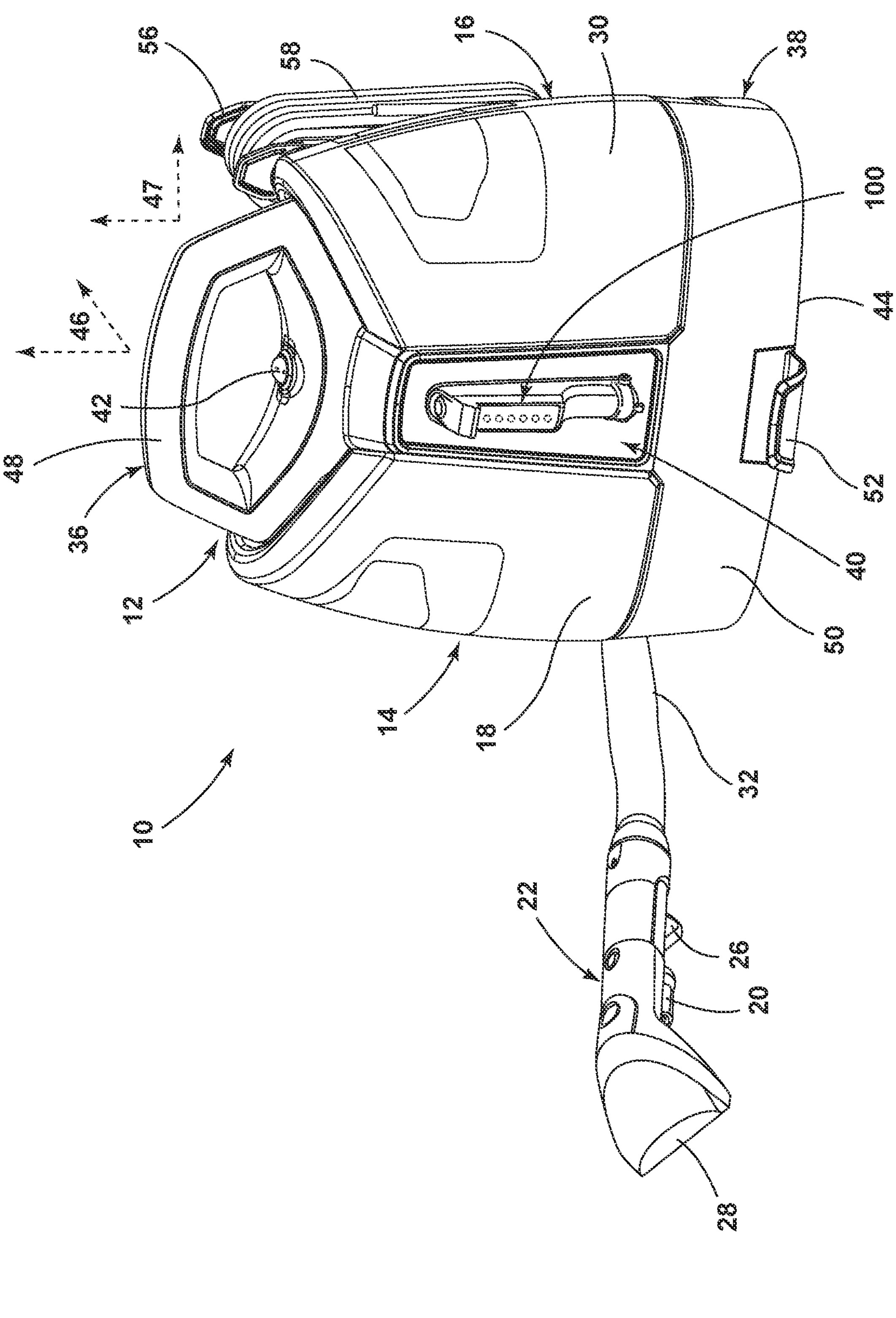
FIG. 1 is a front perspective view of a portable extraction cleaner with task lighting according to a first embodiment of the invention.
Figure 2:
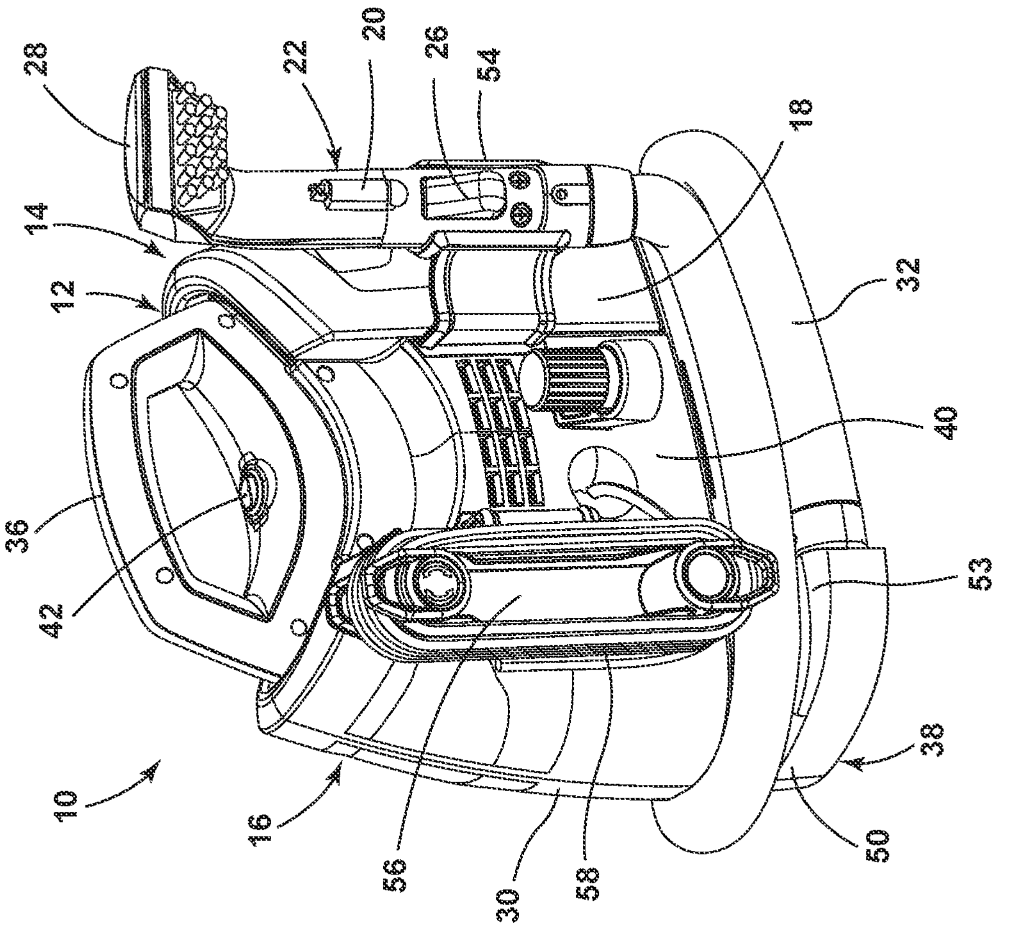
FIG. 2 is a rear perspective view of the portable extraction cleaner from FIG. 1.
Figure 3:
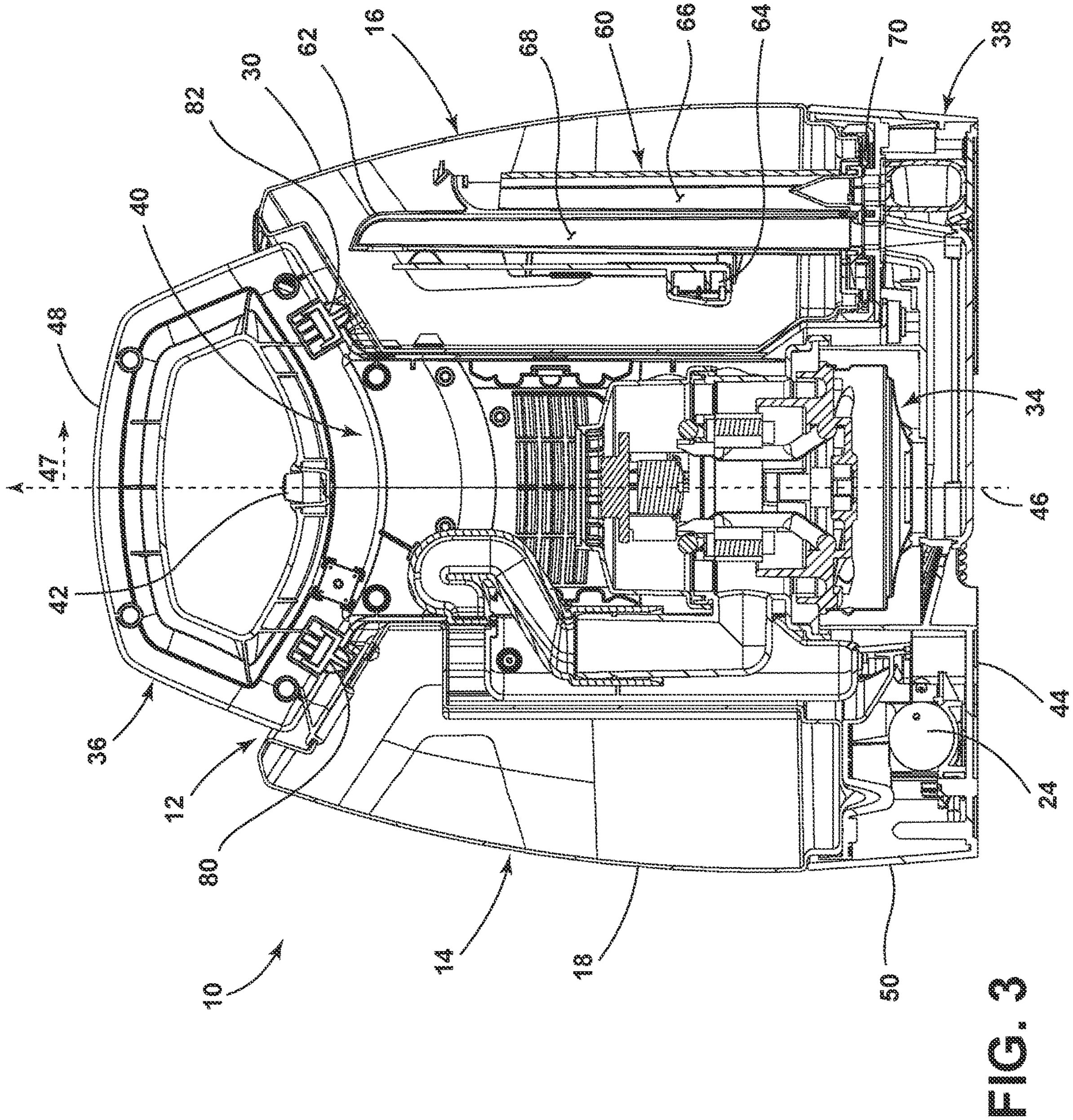
FIG. 3 is a cross-sectional view of the portable extraction cleaner taken through line III-III of FIG. 1.

FIGS. 1-2 show a surface cleaning apparatus with task lighting in the form of a portable extraction cleaner 10, according to a first embodiment of the invention. The extraction cleaner 10 includes a hand-carried body including a main housing 12, a fluid delivery system 14 configured to store cleaning fluid and to deliver the cleaning fluid to the surface to be cleaned, and a fluid recovery system 16 configured to remove the fluid and debris from the surface to be cleaned and to store the recovered fluid and debris. The fluid delivery system 14 can more particularly be a liquid delivery system 14 configured to store cleaning liquid and to deliver the cleaning liquid to the surface to be cleaned.

As discussed in further detail below, the portable extraction cleaner 10 is provided with various features and improvements related to lighting or illumination of the surface to be cleaned, which are described in further detail below. Task lighting 100 is provided on the portable extraction cleaner 10 and selectively illuminates a surface to be cleaned. Using the task lighting 100, a user can easily find stains, spots, or debris on the surface, even a dimly lit location. The task lighting 100 provides increased light for cleaning in a room that may or may not already have some ambient light. The task lighting 100 is especially useful for seeing small spot or stains on the surface, including spots and stains having low contrast relative to the surface. The task lighting 100 can also provide increased light for spot treating that requires accuracy, such as delivering cleaning fluid to particular spot on a surface. Using the task lighting 100, a user may more easily determine a surface has been suitably cleaned, including when a spot or stain has been removed from the surface, builds confidence in the extraction cleaner 10, cleaning process, and results.

The task lighting 100 produces visible light in the range of 400-700 nanometers. In other embodiments, the task lighting 100 may additionally produce light in the ultraviolet range, i.e. below 400 nanometers. The ultraviolet portion of the light is effective for illuminating various organic stains, such as food or urine for example, which glow or fluoresce in the presence of ultraviolet light wavelengths and are thus easily identifiable for cleaning/treatment.

For purposes of description related to the figures, the terms upper, lower, vertical, horizontal, and derivatives thereof shall relate to the exemplary extraction cleaner 10 as oriented in FIG. 1, with the extraction cleaner 10 resting on a surface or being carried by the carry handle. However, it is to be understood that aspects of the present disclosure may assume various alternative orientations, except where expressly specified to the contrary.

The main housing 12 is adapted to selectively mount components of the fluid delivery system 14 and the fluid recovery system 16 to form an easy-to-carry unit that can be transported by a user to different locations with surfaces to be cleaned. The extraction cleaner 10 is adapted to be hand carried by a user to carpeted areas for cleaning relatively small areas and extracts cleaning fluid and debris from the surface.

The fluid delivery system 14 can include a supply tank 18 for storing a supply of cleaning fluid and a fluid distributor 20 provided on a hand-held cleaning tool 22 in fluid communication with the supply tank 18 for depositing a cleaning fluid onto the surface. The cleaning fluid stored by the supply tank 18 can comprise one or more of any suitable cleaning liquids, including, but not limited to, water, compositions, concentrated detergent, diluted detergent, etc., and mixtures thereof. For example, the fluid can comprise a mixture of water and concentrated detergent. The supply tank 18 can be refillable, and can be formed of a transparent or tinted translucent material, which permits a user to view the contents thereof. The supply tank 18 can comprise a blow-molded tank body.

Various combinations of optional components can be incorporated into the fluid delivery system 14, such as a fluid pump, a heater, and/or fluid control and mixing valves, as well as suitable conduits or tubing fluidly connecting the components of the fluid delivery system 14 together to effect the supply of cleaning fluid from the supply tank 18 to the fluid distributor 20. For example, in the illustrated example the fluid delivery system 14 can further comprise a flow control system for controlling the flow of fluid from the supply tank 18 to the fluid distributor 20. In one configuration, the flow control system can comprise a pump 24 that pressurizes the system 14. An actuator can be provided to dispense fluid from the fluid distributor 20. The actuator can, for example, include a trigger 26 on the hand-held cleaning tool 22 or on a wand connecting the cleaning tool 22 to the hose 32. The actuator can be operably coupled to the pump 24 such that pressing the actuator will activate the pump 24, or can be operably coupled to a flow control valve which controls the delivery of fluid from the pump 24 to the distributor 20 such that pressing the actuator will open the valve.

The fluid recovery system 16 can include an extraction path in the form of an extraction nozzle 28 provided on the cleaning tool 22, which is adapted to be used on the surface to be cleaned, a recovery tank 30, and a flexible hose 32 defining a vacuum or suction conduit in fluid communication with the extraction nozzle 28 and the recovery tank 30. The hose 32 can also include an internal fluid conduit in fluid communication with the supply tank 18 and the fluid distributor 20 for delivering cleaning fluid via the internal conduit. The recovery tank 30 can be formed of a transparent or tinted translucent material, which permits a user to view the contents thereof. The recovery tank 30 can comprise a blow-molded tank body.

The fluid recovery system 16 further includes a suction source in the form of a motor/fan assembly 34 in fluid communication with the extraction nozzle 28 for generating a working airflow to draw liquid and entrained debris through the extraction path. The motor/fan assembly 34 can be provided fluidly downstream of the recovery tank 30, although other extraction paths are possible.

The supply and recovery tanks 18, 30 can be removably mounted on the main housing 12. The main housing 12 can include a carry handle 36 to form an easy-to-carry unit with the supply and recovery tanks 18, 30 that can be transported by a user to different locations with surfaces to be cleaned. The main housing 12 can further include a base 38 on which the supply and recovery tanks 18, 30 are at least partially supported, and a partition 40 extending upwardly from the base 38, between the supply and recovery tanks 18, 30. The partition 40 can comprise an enclosure housing one or more components of the extraction cleaner 10, such as the motor/fan assembly 34.

A main power switch 42 is configured to control the supply of power from a power source of the extraction cleaner 10 to one or more electrical components of the extraction cleaner 10, such as the pump 24 and/or the motor/fan assembly 34. As described in further detail below, the power source of the extraction cleaner 10 can, for example, comprise a power cord 58 or a battery onboard the extraction cleaner 10. The main power switch 42 is shown herein as comprising a button 42 provided adjacent the carry handle 36 and is operably coupled to one or more electrical components of the extraction cleaner 10, such as the pump 24 and/or the motor/fan assembly 34. Other configurations for actuating the main power switch are possible.

The base 38 can comprise a housing with a flat bottom 44 that is adapted to rest directly on a surface, such as a horizontal surface or floor surface. Conveniently, the carry handle 36 can be provided opposite the flat bottom 44 so that a user can easily pick up the extraction cleaner 10.

The partition 40 can generally divide the extraction cleaner 10 into two halves, with a partition plane 46 extending through the center, i.e. the middle, of the partition 40. The supply and recovery tanks 18, 30 can be provided on opposing sides of the partition plane 46. A handle plane 47 can extend through the center, i.e. the middle, of the carry handle 36, orthogonally to the partition plane 46. The partition plane 46 can bisect the carry handle 36 and the handle plane 47 can bisect the supply and recovery tanks 18, 30 for a balanced weight-in-hand.

The partition 40 can include the carry handle 36 at an upper portion thereof, above the supply and recovery tanks 18, 30, which facilitates carrying the extraction cleaner 10 from one location to another. In one example, the carry handle 36 can define a handle grip 48 spaced above the supply and recovery tanks 18, 30, and the handle grip 48 can be positioned to not intersect the supply tank 18 or the recovery tank 30. The partition plane 46 can intersect the middle of the handle grip 48. Further, the tanks 18, 30 can be spaced along a direction that is parallel to the handle grip 48.

Either of the base 38 and the partition 40 can further define one or more internal chambers for receiving components of the extraction cleaner 10. For example, the base 38 can include an internal chamber for receiving the pump 24 and the partition 40 can include an internal chamber for receiving the motor/fan assembly 34.

In FIG. 1, the hand-held tool 22 and hose 32 are shown in a use or operational position. In FIG. 2, the hand-held tool 22 and hose 32 are shown stored on the main housing 12. The base 38 includes a skirt 50 having a hose clip 52 on one side thereof adapted to retain the hose 32 when it is wrapped around the skirt 50 for storage. The skirt 50 can include a hose rest 53 on another side thereof adapted to support the hose 32 when stored as shown in FIG. 2. A tool retaining bracket 54 can extend from the partition 40 and is adapted to retain the hand-held tool 22 coupled with the terminal end of the hose 32 when the hose 32 is wrapped around the skirt 50. A cord wrap caddy 56 can be provided on a side of the partition 40 for storing a power cord 58 which emerges from the interior of the partition 40 and can be used to provide power to electrical components, such as the pump 24 and/or the motor/fan assembly 34, of the extraction cleaner 10 from a source of power, such as a home power supply, upon actuation of the button 42. Alternatively, the extraction cleaner 10 can be cordless and powered by a portable power supply, such as a battery, upon actuation of the button 42.

The recovery tank 30 defines a recovery chamber and can include an air/liquid separator assembly 60 within the recovery chamber. The air/liquid separator assembly 60 comprises a stack 62 for guiding air and liquid through the recovery tank 30 and a float assembly 64 for selectively closing the extraction path through the recovery tank 30. The stack 62 includes an inlet conduit 66 that receives recovered air and liquid form the extraction nozzle 28, and opens into the interior of the tank 30, and an outlet conduit 68 that passes substantially clean air, and substantially no liquid, to the motor/fan assembly 34. The float assembly 64 is configured to close the extraction path through the outlet conduit 68 as the liquid level in the recovery tank 30 rises to prevent liquid from entering the motor/fan assembly 34.

A mechanical coupling can be provided between the recovery tank 30 and the air/liquid separator assembly 60 for facilitating easy separation of the two components, and is shown herein as a threaded collar 70 that screws onto a neck of the recovery tank 30 that defines an opening that receives the air/liquid separator assembly 60. Other non-limiting examples of suitable mechanical couplings include a bayonet coupling, a threaded coupling, a keyed coupling, and other quick coupling mechanisms.

Figure 4:
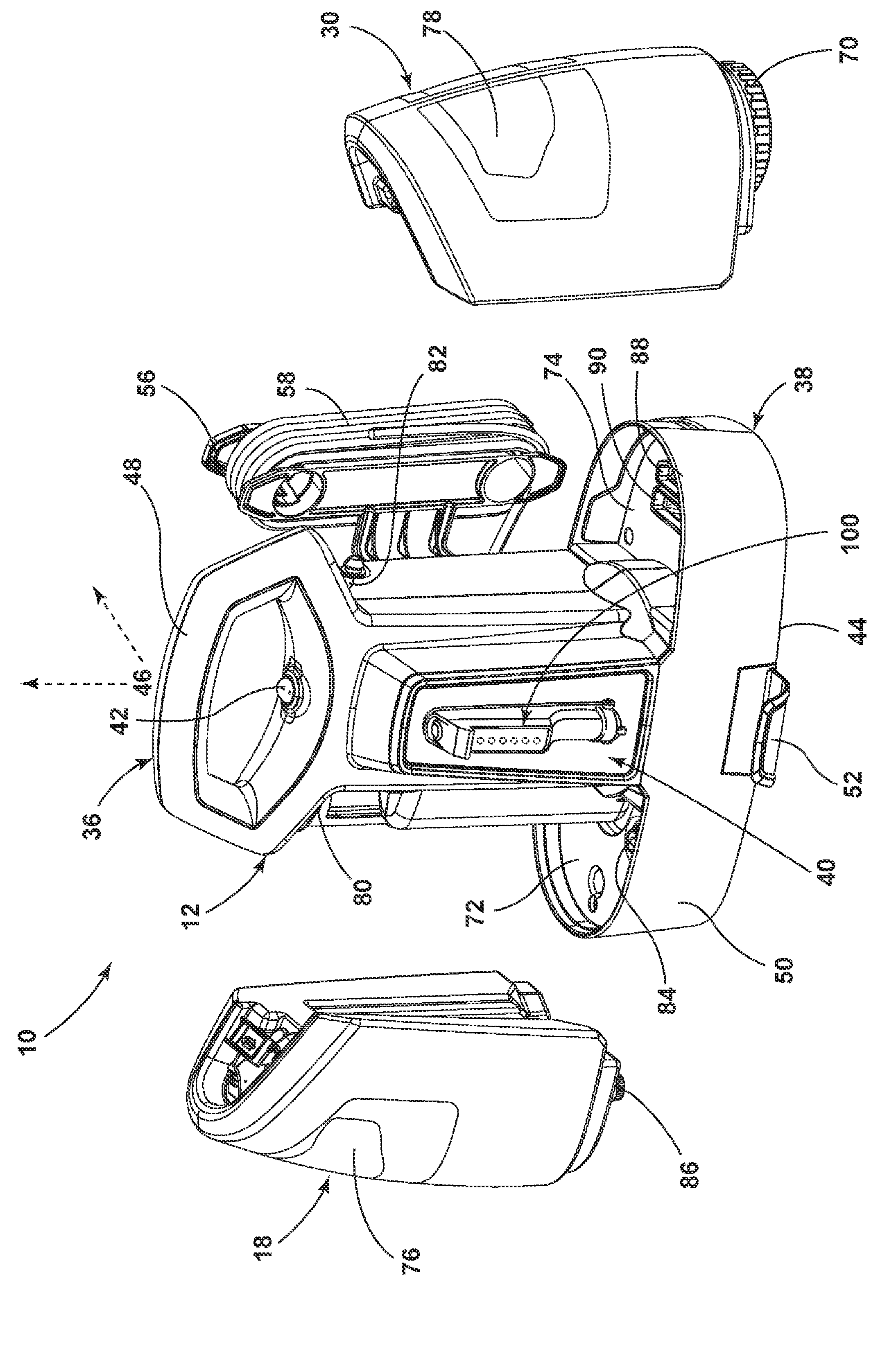
FIG. 4 is a partially exploded view of the portable extraction cleaner from FIG. 1, showing a supply tank and a recovery tank exploded from a main housing.

FIG. 4 is a partially exploded view of the extraction cleaner 10. The main housing 12 comprises a supply tank receiver 72 and a recovery tank receiver 74 for respectively receiving the supply tank 18 and recovery tank 30. As shown, the tank receivers 72, 74 can be provided on opposing sides of the partition plane 46, on either side of the partition 40. Optionally, the supply and recovery tanks 18, 30 can have handgrip indentations 76, 78, respectively that facilitate removing and carrying the tanks 18, 30.

A first latch 80 can be provided on the supply tank receiver 72 for securing the supply tank 18 to the main housing 12 and a second latch 82 can be provided on the recovery tank receiver 74 for securing the recovery tank 30 to the main housing 12. Optionally, the latches 80, 82 can be configured to releasably latch or retain, but not lock, the supply and recovery tanks 18, 30 to the main housing 12, such that a user can conveniently apply sufficient force to the tanks 18, 30 themselves to pull the tanks 18, 30 off the main housing 12.

The supply tank receiver 72 includes a valve seat 84 for fluidly coupling the pump 24 with the supply tank 18 when it is seated within the supply tank receiver 72. The supply tank 18 can include a valve 86 at an outlet thereof configured be received by the valve seat 84. The valve 86 can be adapted to open when the supply tank 18 is seated within the supply tank receiver 72 and to close when the supply tank 18 is removed from the supply tank receiver 72.

The recovery tank receiver 74 includes a liquid port 88 and a suction port 90 for fluidly coupling with the inlet conduit 66 and outlet conduit 68, respectively, of the stack 62, when the recovery tank 30 is seated within the recovery tank receiver 74.

Figure 6:
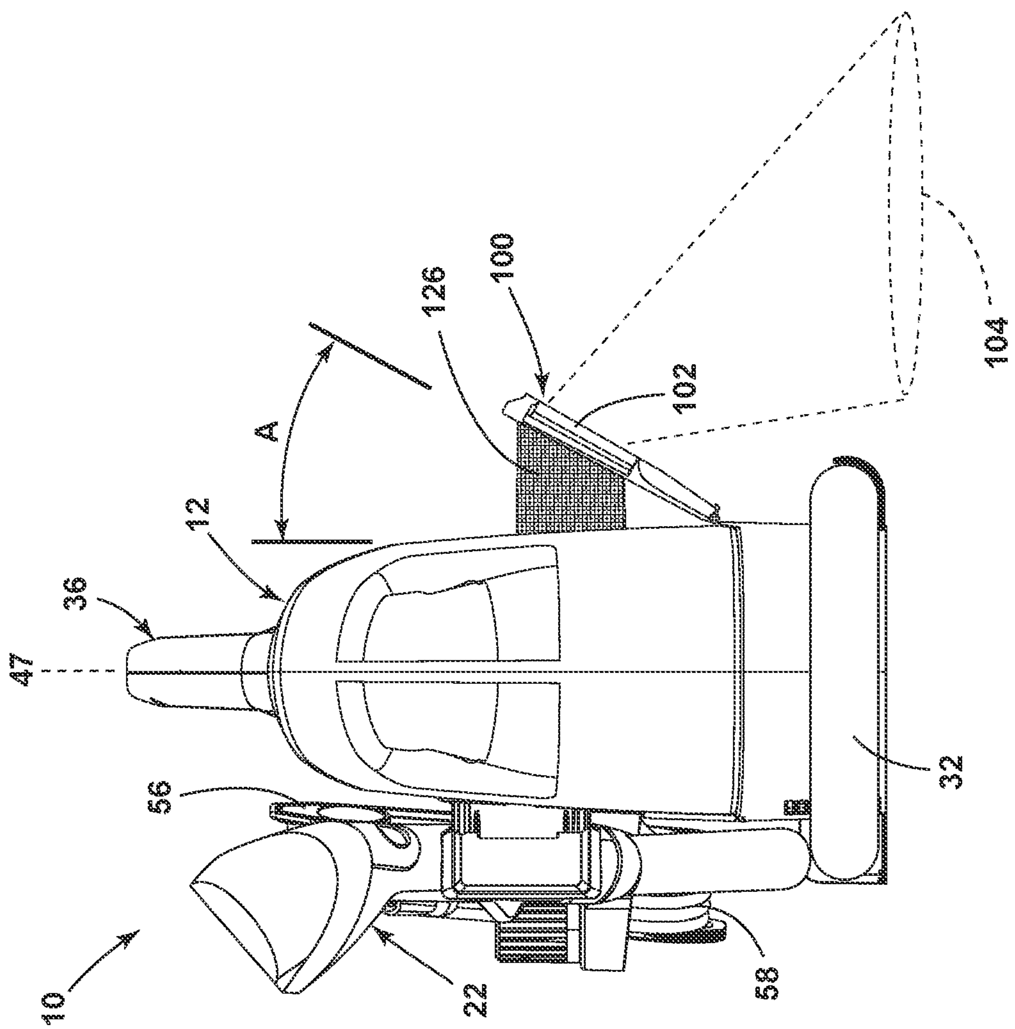
FIG. 6 is a side view of the portable extraction cleaner from FIG. 1, showing the task lighting in a second angled position.
Figure 5:
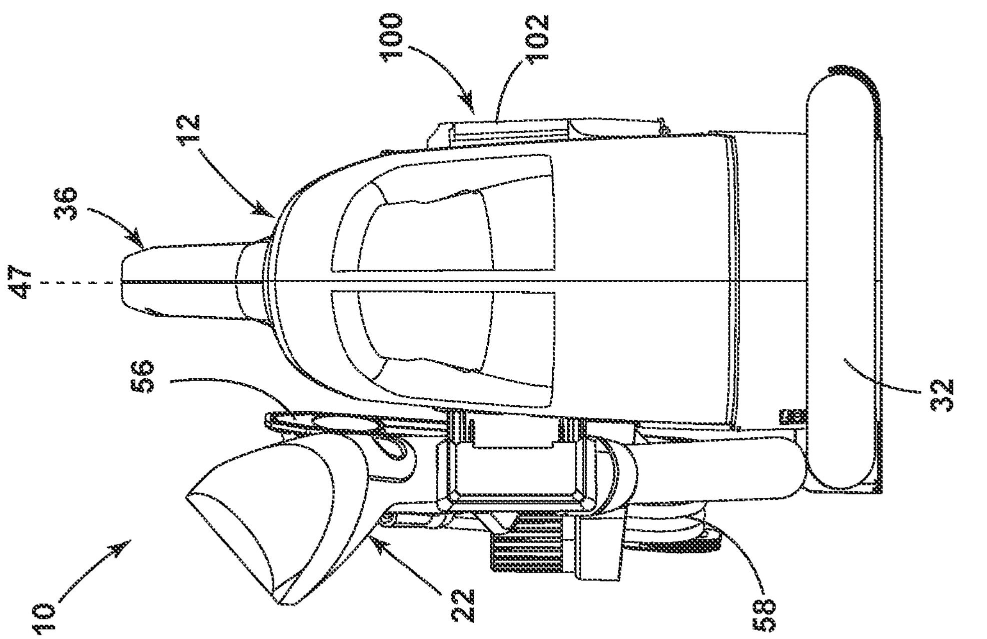
FIG. 5 is a side view of the portable extraction cleaner from FIG. 1, showing the task lighting in a first stored position.

Referring to FIGS. 5-6, task lighting 100 can be provided on one or more locations of the extraction cleaner 10, such as on the hand-carried body or main housing 12, on the hand-held tool 22, on the hose 32, or any combination thereof. In the embodiment shown in FIGS. 5-6, the task lighting 100 is adjustable, and can be aimed in a specific direction to direct illumination toward a desired location, rather than being fixed and non-adjustable relative to the extraction cleaner 10. This may provide a compact storage position for the extraction cleaner 10, as the task lighting 100 can be stowed when not in use, such as being folded against the main housing 12. In addition, the task lighting 100 does not get in the user's way or obstruct the user's view when not in use.

In the embodiment shown, the task lighting 100 comprises a task light 102 provided on the main housing 12. Optionally, the task light 102 is located on the partition 40, between the supply and recovery tanks 18, 30. The task light 102 can further be positioned below the carry handle 36 so that a user can carry the extraction cleaner 10 without obstructing the task light 102. This arrangement allows for the user to ergonomically direct illumination from the task light 102 toward a desired location while comfortably carrying the extraction cleaner 10. The task light 102 can be disposed on one side of the handle plane 47 and intersected by the partition plane 46 to dispose the task light 102 generally at the center, i.e. the middle, of the partition 40. Other possible locations for the task light 102 include, but are not limited to, the carry handle 36 and the base 38.

The task light 102 can be pivotable, articulatable, or otherwise moveable relative to the main housing 12, to provide flexibility in use and storage of the task light 102. In other embodiments, the task light 102 can be fixed on the main housing, rather than being pivotable, articulatable, or otherwise moveable.

In the embodiment shown, the task light 102 can be pivotably coupled to the main housing 12, such as to the partition 40, to direct illumination toward a desired location, and can pivot between a first stored position, shown in FIG. 5, and a second angled position, shown in FIG. 6. In the stored position, the task light 102 is retracted against the main housing 12 for compact storage. In the angled position, the task light 102 is extended away from the main housing 12 to angle the task light 102 toward the surface next to the main housing 12. As shown in FIG. 6, in the angled position, emitted light is directed at a downward angle, outwardly from the main housing 12, and creates an illuminated area 104 on the surface next to the extraction cleaner 10. The placement of the task light 102 in this manner allows for the surface directly next to the main housing 12 to be illuminated so that a user can see the surface very well. Optionally, the task light 102 can emit light in the stored position as well, in which case emitted light is directed generally orthogonally from the main housing 12.

In one embodiment, in the second angled position, the task light 102 is disposed at an angle A relative to the handle plane 47. In the first stored position, the task light 102 can be disposed approximately parallel to the handle plane 47, or may be disposed at an angle relative to the handle plane 47 that is smaller than angle A. In either case, the task light 102 pivots away from the handle plane 47 when moving to the second angled position.

In some embodiments, the orientation angle A at which the task light 102 is disposed in the second angled position can be fixed, such that the task light 102 moves between static stored and angled positions. In other embodiments, the orientation angle A can be adjustable within a range of possible angles. With an adjustable orientation angle A, a user can select the angled position of the task light 102 to change where the illuminated area 104 falls relative to the extraction cleaner 10.

Figure 7:
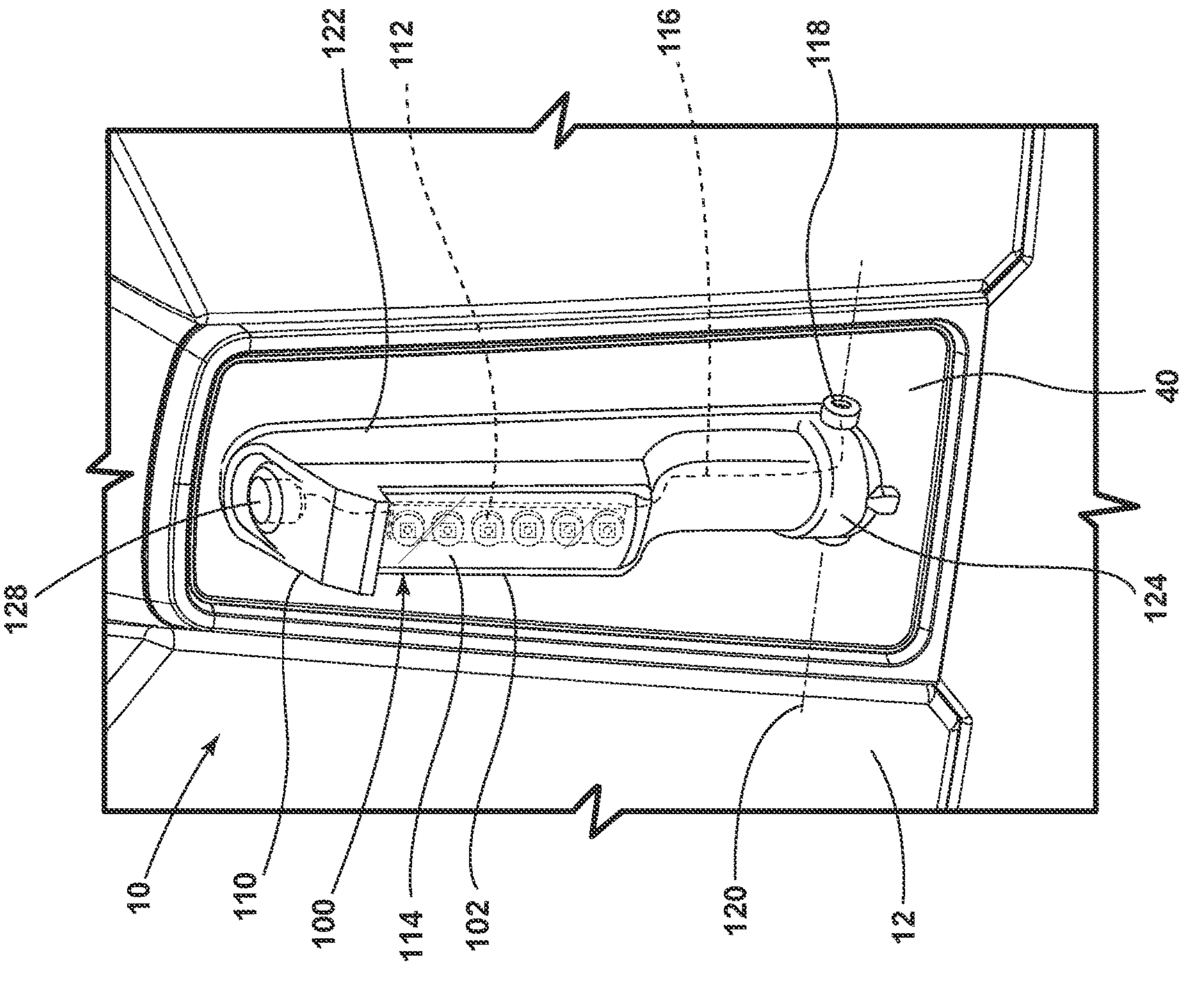
FIG. 7 is a close-up view of the task lighting on the portable extraction cleaner from FIG. 1.

FIG. 7 shows one embodiment of the task light 102 comprising a casing 110, and at least one light source 112 enclosed within the casing 110, behind a transparent or translucent cover 114. The light source 112 emits light, which can shine through the cover 114 and/or another portion of the casing 110. Wiring 116 connects the light source 112 to the power source of the extraction cleaner 10, i.e. the power cord 58 or a battery in embodiments where the extraction cleaner 10 is cordless.

The light source 112 can comprise any element or assembly capable of emitting light, and can, for example, be an array of light emitting diodes (LEDs) as shown herein. An LED may be a semiconductor light emitting diode or it may be a light emitting device employing a different technology to produce light. Other light sources 112 include incandescent lamps, e.g. halogen, arc lamps, and gas-discharge lamps, e.g. fluorescent. A plurality of light sources 112 can be included in the casing 110. Any number of individual light sources 112 may be arranged in a variety of configurations. In FIG. 7, an array of six LEDs 112 disposed in a column is shown to illustrate one embodiment. All six LEDs 112 may be arranged behind the transparent or translucent cover 114. Alternatively, individual covers for each LED 112 may be provided instead or in addition to cover 114.

The task light 102 is pivotably coupled to the main housing 12 by a hinge 118, and can pivot about an axis 120 defined by the hinge 118. The axis 120 may be parallel to the handle plane 47. As shown in the illustrated embodiment, the casing 110 can be elongated vertically, with a first end 122 containing the plurality of light sources 112 and a second end 124 coupled to the main housing 12 by the hinge 118 and containing the wired connection to the power source of the extraction cleaner 10. When pivoting to the angled position, the second end 124 moves away from the main housing 12 while the first end 122 remains close to the main housing 12 by the attachment of the hinge 118.

Optionally, a tether 126 can be attached between the main housing 112 and the casing 110 for supporting the casing 110 in the angled position. The tether 126 can have a fixed length, such that the orientation angle A is fixed, or may have an adjustable length in order to provide an adjustable orientation angle A. The tether 126 may be a flexible or rigid support. For example, as shown in FIG. 6, the tether 126 can comprise a flexible strap. In another embodiment, the tether 126 can comprise a rigid mechanical linkage.

An on/off switch 128, also referred to herein as a task light power switch, can be provided for the task light 102, and is configured to control the supply of power from the power source of the extraction cleaner 10 to the task light 102. The on/off switch 128 can comprise a push button or toggle provided on the task light 102 or elsewhere on the extraction cleaner 10 that turns the power to the task light 102 on and off. With a push button or toggle, the task light 102 can be turned on and off in either the stored position shown in FIG. 5 or the angled position shown in FIG. 6. Other configurations for actuating the task light power switch are possible.

In another embodiments, the on/off switch 128 can be actuated based on the position of the task light 102. For example, the task light 102 can be automatically turned on by movement to the angled position shown in FIG. 6 and automatically turned off by movement to the stored position shown in FIG. 5. In yet another embodiments, the on/off switch 128 can be actuated based input from a motion detector.

In either case, the operation of the task light 102 can be dependent on or independent of the state of the main power switch 42. In an embodiment where the operation of the task light 102 is dependent on the state of the main power switch, the main power switch may need to be "on" to turn the task light 102 on. If the on/off switch 128 is actuated when the main power switch is "off," the task light 102 will not turn on. In an embodiment where operation of the task light 102 is independent of the state of the main power switch, the task light 102 can be turned on even when the main power switch is "off." This may be useful when the user is looking for spots, stains, or debris on a surface, and wants to use the task light 102 without having the other electrical components of the extraction cleaner 10 on. Once a spot, stain, or debris is located using the task lighting, the user can actuate the main power switch and begin cleaning.

In another embodiments, the task light 102 can be powered when the extraction cleaner 10 is powered. Actuation of the main power switch 42 can supply power to the task light 102.

In operation, the extraction cleaner 10 can be used to locate and treat a stain on a surface to be cleaned. Prior to actually cleaning, a stain can be located with the assistance of the task light 102. While cleaning, the user can set the housing 12 next to the stain, with the task light 102 shining on the stain. The stain is treated by applying a cleaning fluid to the stained surface from the supply tank 18 and extracting the cleaning fluid from the surface into the recovery tank 30. This can be done alternately, by first applying cleaning fluid to the surface and scrubbing the stained surface, and then extracting debris-containing fluid from the surface. For cleaning fluid application, when power is applied to the pump 24 and the trigger 26 is pressed, cleaning fluid is distributed from the supply tank 18 to the stained surface via the fluid distributor 20. The hand-held tool 22 can be used to agitate or scrub the surface. For extraction, when power is applied to the motor/fan assembly 34, a suction force is generated in the extraction path. Suction force at the extraction nozzle 28 of the tool 22 draws debris-containing fluid, which can contain air and liquid into the recovery tank 30. Liquid and debris in the fluid fall under the force of gravity to the bottom of the recovery tank 30. The air drawn into the recovery tank 30, now separated from liquid and debris, exits the recovery tank 30 and continues with the extraction path to an exhaust outlet (not shown) in the main housing, whereupon the air exits the extraction cleaner 10.

Figure 8:
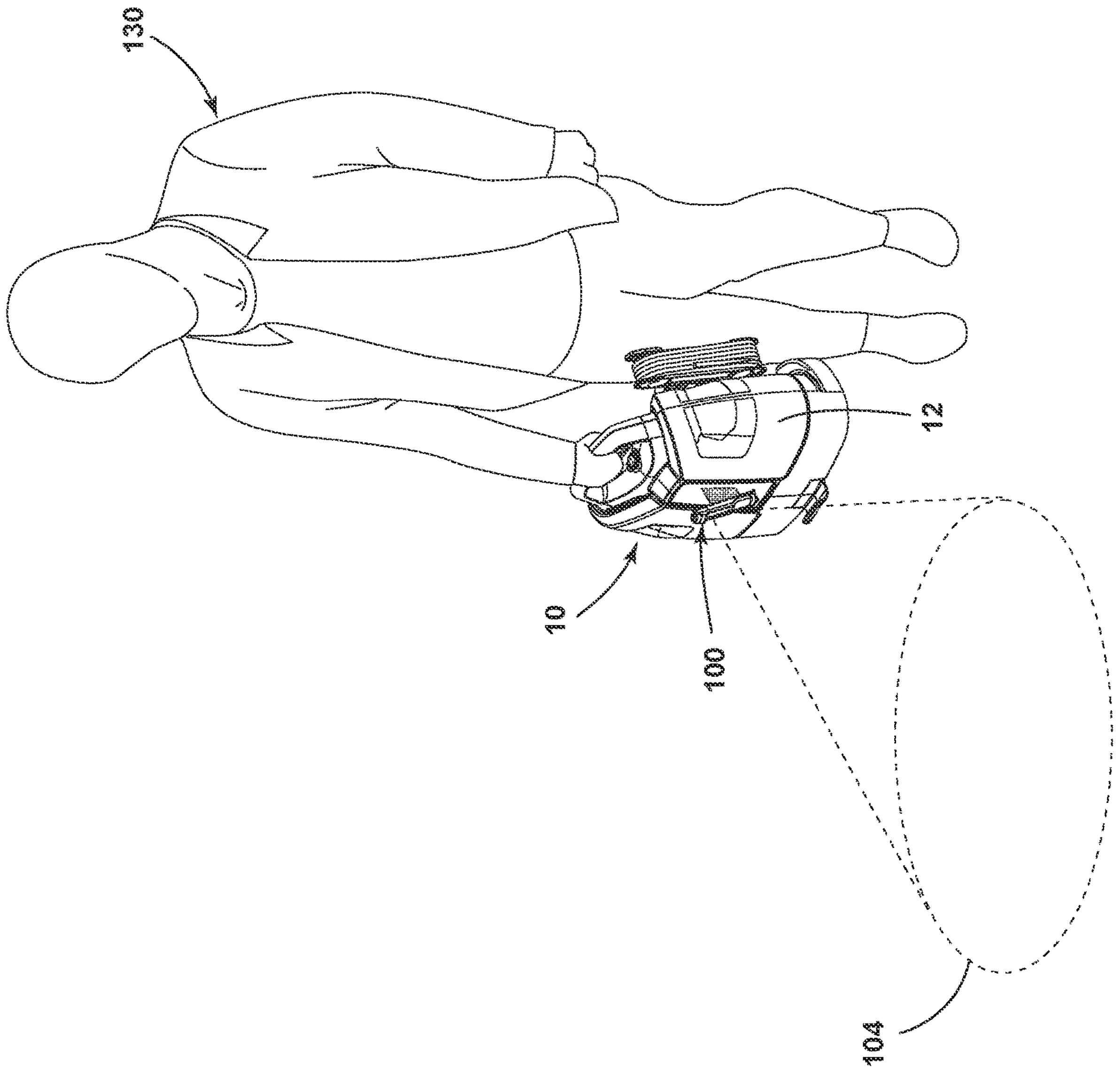
FIG. 8 shows a user carrying the portable extraction cleaner from FIG. 1 and illuminating an area on a surface to be cleaned with the task lighting.

FIG. 8 illustrates one manner in which the extraction cleaner 10 may be used. FIG. 8 shows a user 130 carrying the extraction cleaner 10 in one hand and shining the task light 102 around as a spotlight to locate spots, stains, or debris on a surface. Once an area to be cleaned is identified, the user 130 can set the main housing 12 down on the surface, optionally with the task light 102 still illumining the area, and clean the area with the hand-held tool 22.

Figure 9:
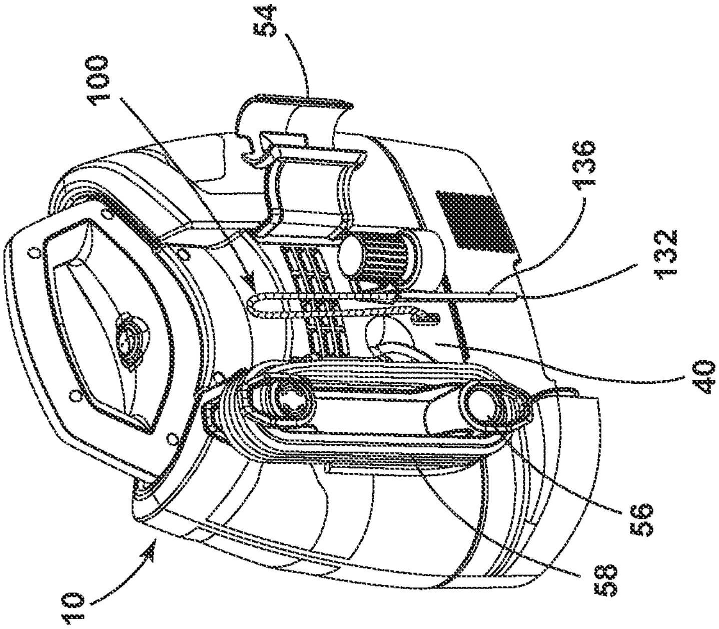
FIG. 9 is a rear perspective view of a portable extraction cleaner with task lighting according to a second embodiment of the invention, showing the task lighting in a first position.
Figure 10:
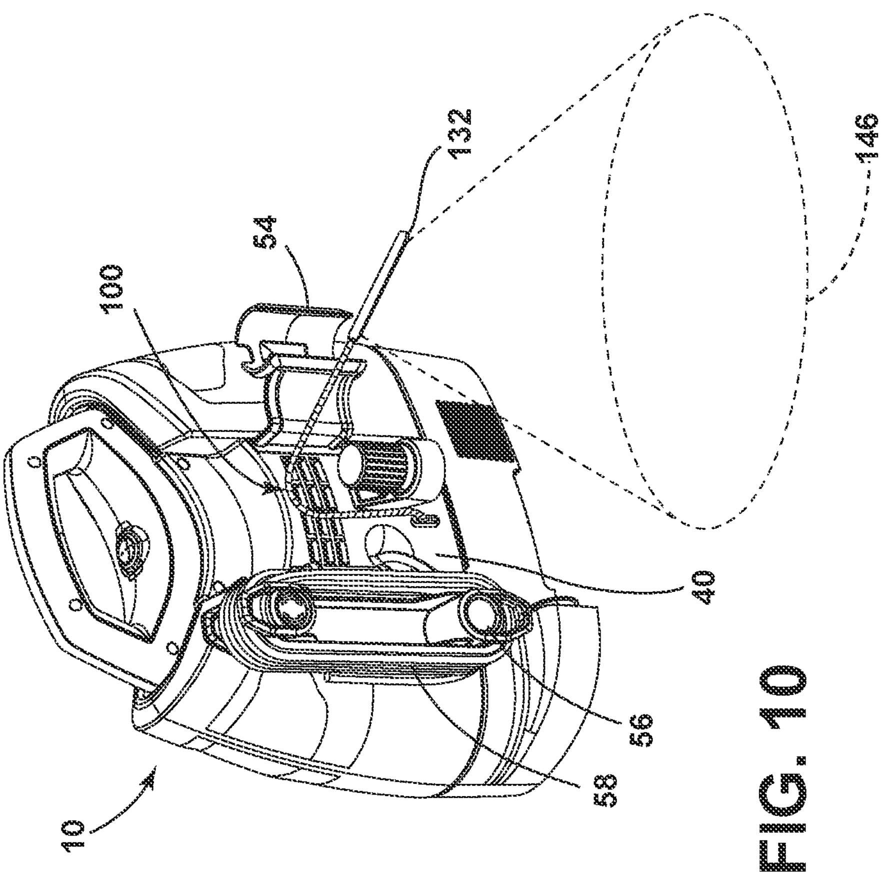
FIG. 10 is a view similar to FIG. 9, showing the task lighting in a second position.

FIGS. 9-10 show a portable extraction cleaner 10 according to a second embodiment of the invention, in which like elements are referred to with the same referenced numerals used for the first embodiment. In the second embodiment, the task lighting 100 comprises an adjustable snake light 132. The snake light 132 is provided on the main housing 12. Optionally, the snake light 132 is coupled to the partition 40, between the tool retaining bracket 54 and the cord wrap caddy 56. It is noted that the portable extraction cleaner 10 of FIGS. 9-10 can comprise a hand-held cleaning tool 22 and hose 32 as shown in FIGS. 1-2, but that the tool 22 and hose 32 are not shown for clarity.

Figure 11:
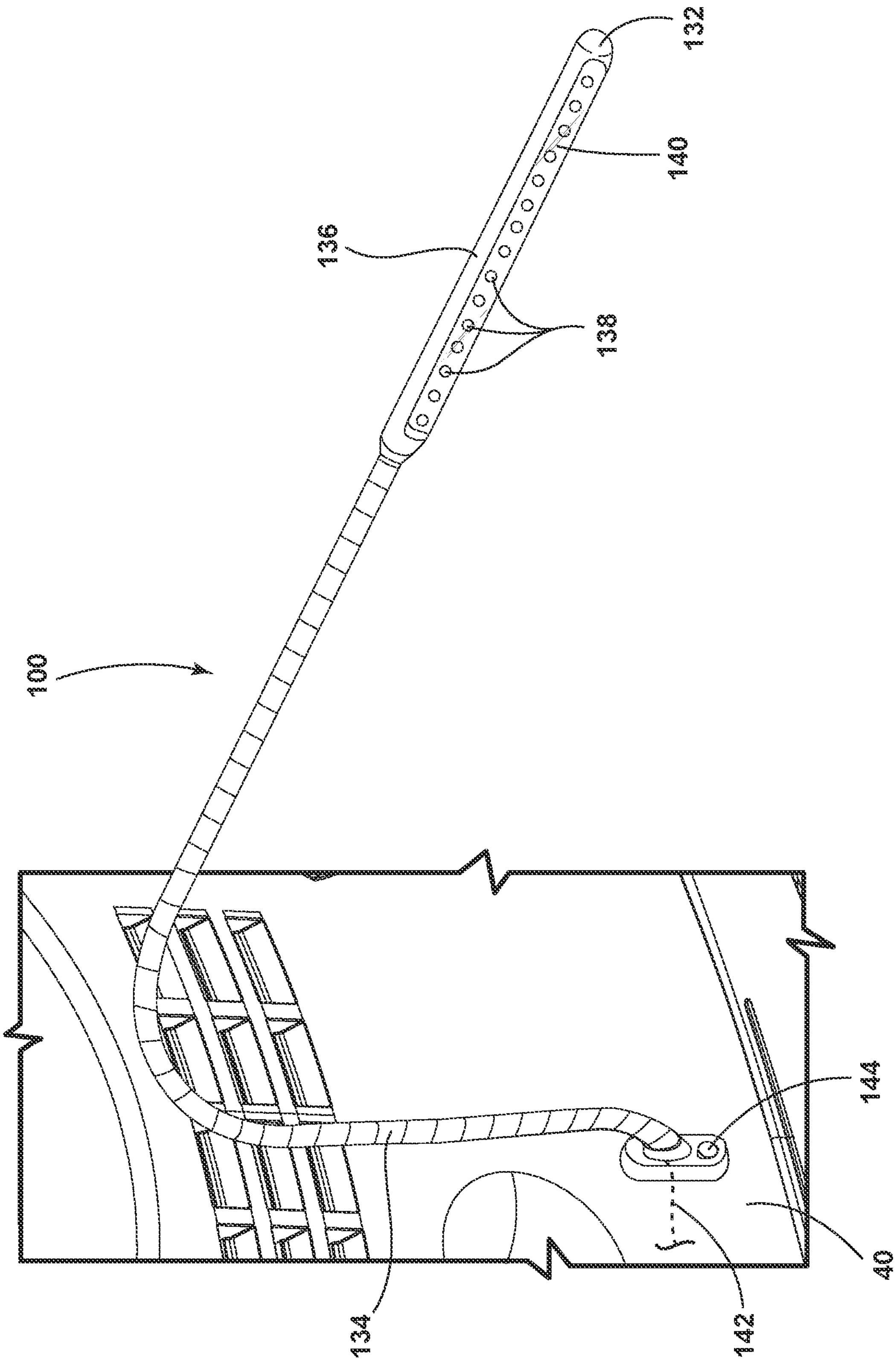
FIG. 11 is a close-up view of the task lighting on the portable extraction cleaner from FIG. 10.

Referring to FIG. 11, the snake light 132 can comprise a flexible arm 134, a casing 136 supported by the flexible arm 134, at least one light source 138 enclosed within the casing 136, behind a transparent or translucent cover 140. The light source 138 emits light, which can shine through the cover 140 and/or another portion of the casing 136. Wiring 142 connects the light source 138 to the power source of the extraction cleaner 10, i.e. the power cord 58 or a battery in embodiments where the extraction cleaner 10 is cordless.

The flexible arm 134 includes a proximal end coupled with the main housing 12 and a distal end which supports the at least one light source 138. The flexible arm 134 can be made of any material that allows the light source 138 to be repositioned relative to the main housing 12 of the extraction cleaner 10, and for maintaining a particular orientation once placed in the particular orientation. The flexible arm 134 can comprise metal, plastic, rubber, or any combination thereof. The flexible arm 134 can be a single piece, or the flexible arm 134 can comprise a plurality of pieces hingedly or otherwise adjustably connected one to another to impart flexibility to the arm 134. The flexible arm 134 may be hollow, so that wiring 142 may pass therethrough. The flexible arm 134 may be extended into narrow, hard-to-reach, or confined areas, with the at least one light source 138 illuminating the area.

The light source 138 can comprise any element or assembly capable of emitting light, and can, for example, be an array of light emitting diodes (LEDs) as shown herein. Other light sources 138 include incandescent lamps, e.g. halogen, arc lamps, and gas-discharge lamps, e.g. fluorescent. A plurality of light sources 138 can be included in the casing 136. Any number of individual light sources 138 may be arranged in a variety of configurations. In FIGS. 9-10, an array of LEDs disposed in a row is shown to illustrate one embodiment. All LEDs 138 may be arranged behind the transparent or translucent cover 140. Alternatively, individual covers for each LED 138 may be provided instead or in addition to cover 140.

An on/off switch 144 can be provided for the snake light 132, and turns the power to the snake light 132 on and off. The on/off switch 144 can comprise a push button or toggle provided on the snake light 132 or elsewhere on the extraction cleaner 10. In another embodiments, the on/off switch 144 can be actuated based on the position of the snake light 132.

The flexible arm 134 can be manipulated to direct illumination toward a desired location. Two examples of positions for the snake light 132 are shown in FIGS. 9-10, although a variety of other positions are possible. In FIG. 9, the flexible arm 134 is bent to a stored position, where the snake light 132 is folded against the main housing 12 for compact storage. In addition, the snake light 132 does not get in the user's way or obstruct the user's view when not in use. FIG. 10 shows a use position, where the casing 136 is extended away from the main housing 12 and emitted light is directed at a downward angle, outwardly from the main housing 12, and creates an illuminated area 146 on the surface next to the extraction cleaner 10. Various other use positions are possible by flexing the arm 134 in different directions.

Figure 12:
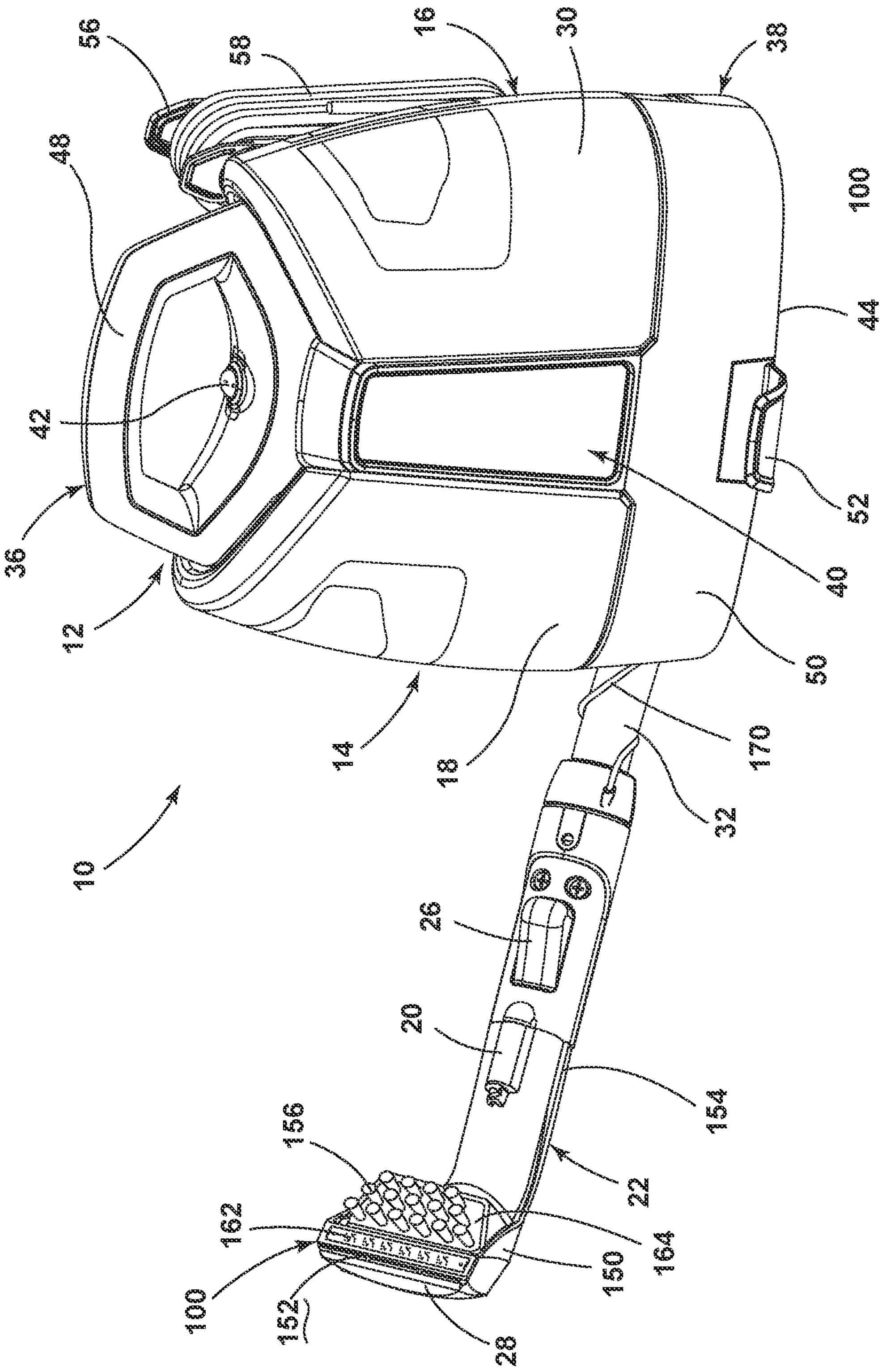
FIG. 12 is a front perspective view of a portable extraction cleaner with task lighting according to a third embodiment of the invention.
Figure 13:
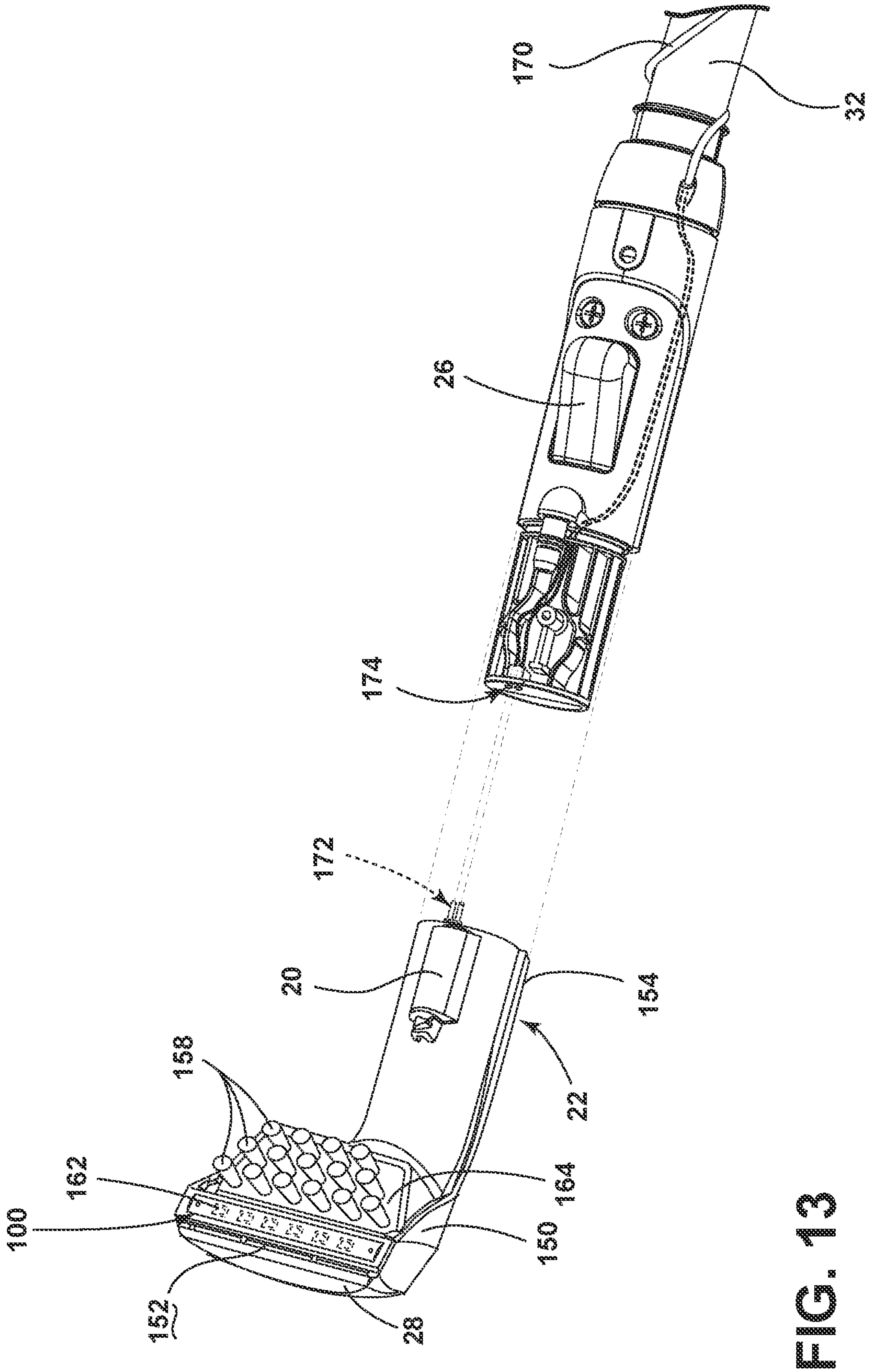
FIG. 13 is an exploded view showing a hand-held cleaning tool and a portion of a hose of the portable extraction cleaner from FIG. 12.
Figure 14:
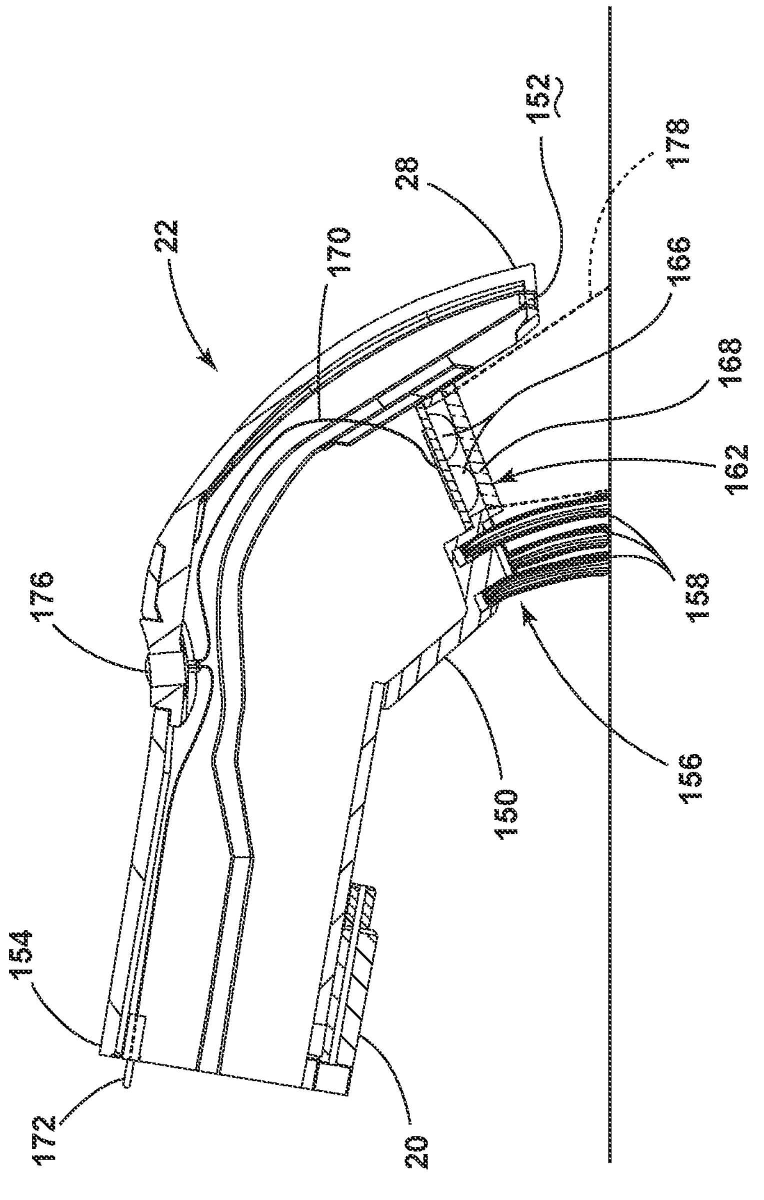
FIG. 14 is a cross-sectional view of the hand-held cleaning tool from FIG. 13.

FIGS. 12-14 show a portable extraction cleaner 10 according to a third embodiment of the invention, in which like elements are referred to with the same referenced numerals used for the first embodiment. In the third embodiment, the task lighting 100 is provided on the hand-held tool 22.

The hand-held tool 22 of the present embodiment includes a housing, optionally, a multi-part housing, defining a tool body 150 with the extraction nozzle 28 at a forward portion of the tool body 150 defining a suction nozzle inlet 152. The suction nozzle inlet 152 can be defined by an elongate, narrow opening to generate high velocity airflow into the tool 22. A conduit 154 at a rearward portion of the tool body 150 is configured to be fluidly connected to hose 32 to draw a working airflow through an airflow pathway of the tool 22.

An agitator 156 can be provided on the tool body 150 for scrubbing the surface to be cleaned. As shown in the illustrated embodiment, the agitator 156 can comprise a plurality of bristles 158 located rearward of the extraction nozzle 28. The bristles 158 can be bundled together in tufts to provide the desired stiffness and durability for agitation. Other agitators 156 are possible.

The fluid distributor 20 delivers the cleaning fluid to the surface to be cleaned, and can be located rearward of the extraction nozzle 28 and agitator 156. In one embodiment, the distributor 20 can comprise a spray tip configured to distribute cleaning fluid in a pressurized fan-shaped spray pattern downwardly onto the surface to be cleaned upon actuation of the trigger 26.

In the embodiment shown, the task lighting 100 comprises a task light 162 provided on the tool body 150 of the tool 22. Optionally, the task light 162 is located at a bottom side 164 of the tool 22, between the suction nozzle inlet 152 and the agitator 156. The task light 162 can further be positioned forwardly of the conduit 154 so that a user can grip the tool 22 without obstructing the task light 162. Alternatively, it is contemplated that the task light 162 can optionally be positioned in other locations such as forwardly of nozzle 28 or rearwardly of the bristles 158, for example.

The task light 162 on the tool 22 is positioned to illuminate the surface below the tool body 150. Holding the tool 22, the user can easily adjust the angle of the task light 162 and can direct light on a surface as the user cleans. In other embodiments, the task light 162 can be positioned to emit illumination in front of the tool body 150, i.e. forwardly of the extraction nozzle 28 or to the side of the tool body 150, i.e. laterally of the extraction nozzle 28.

Referring to FIG. 14, the task light 162 comprising at least one light source 166 behind a transparent or translucent cover 168 of the tool body 150. The light source 166 emits light, which can shine through the cover 168 and/or another portion of the tool 22. Emitted light is directed downwardly from the tool 22, outwardly from the tool body 150, and creates an illuminated area 178 on the surface beneath the tool 22. With the task light 162 in this location on the tool body 150, the task light 162 does not get in the user's way or obstruct the user's view when not in use.

The light source 166 can comprise any element or assembly capable of emitting light, and can, for example, be an array of light emitting diodes (LEDs) as shown herein. An LED may be a semiconductor light emitting diode or it may be a light emitting device employing a different technology to produce light. Other light sources 166 include incandescent lamps, e.g. halogen, arc lamps, and gas-discharge lamps, e.g. fluorescent. A plurality of light sources 166 can be included in the tool body 150. Any number of individual light sources 166 may be arranged in a variety of configurations. An array of LEDs 166 is shown to illustrate one embodiment. All LEDs 166 may be arranged behind the transparent or translucent cover 168. Alternatively, individual covers 168 for each LED 166 may be provided.

Wiring 170 connects the light source 166 to the power source of the extraction cleaner 10, i.e. the power cord 58 or a battery in embodiments where the extraction cleaner 10 is cordless. Optionally, a portion of the wiring 170 can extend along, i.e. be attached to or otherwise formed with the hose 32, which may be externally- or internally-wired. For example, the hose shown in FIGS. 12-13 is externally-wired, with a portion of the wiring 170 wrapping around and extending along the length of the hose 32. Appropriate electrical connectors 172, 174 can be provided on the hand-held tool 22 and the hose 32, respectively, for detachable electrical connection of the light source 166 to the power source of the extraction cleaner 10.

An on/off switch 176 can be provided for the task light 162, and turns the power to the task light 162 on and off. The on/off switch 176 can comprise a push button or toggle provided on the tool body 150, hose 32, or elsewhere on the extraction cleaner 10.

In another embodiment, the on/off switch 176 can be actuated based on whether the hand-held tool 22 is retained in the tool retaining bracket 54. For example, the task light 162 can be automatically turned on when the hand-held tool 22 is separated from the tool retaining bracket 54 and automatically turned off when the hand-held tool 22 is installed in the tool retaining bracket 54 for storage.

Figure 15:
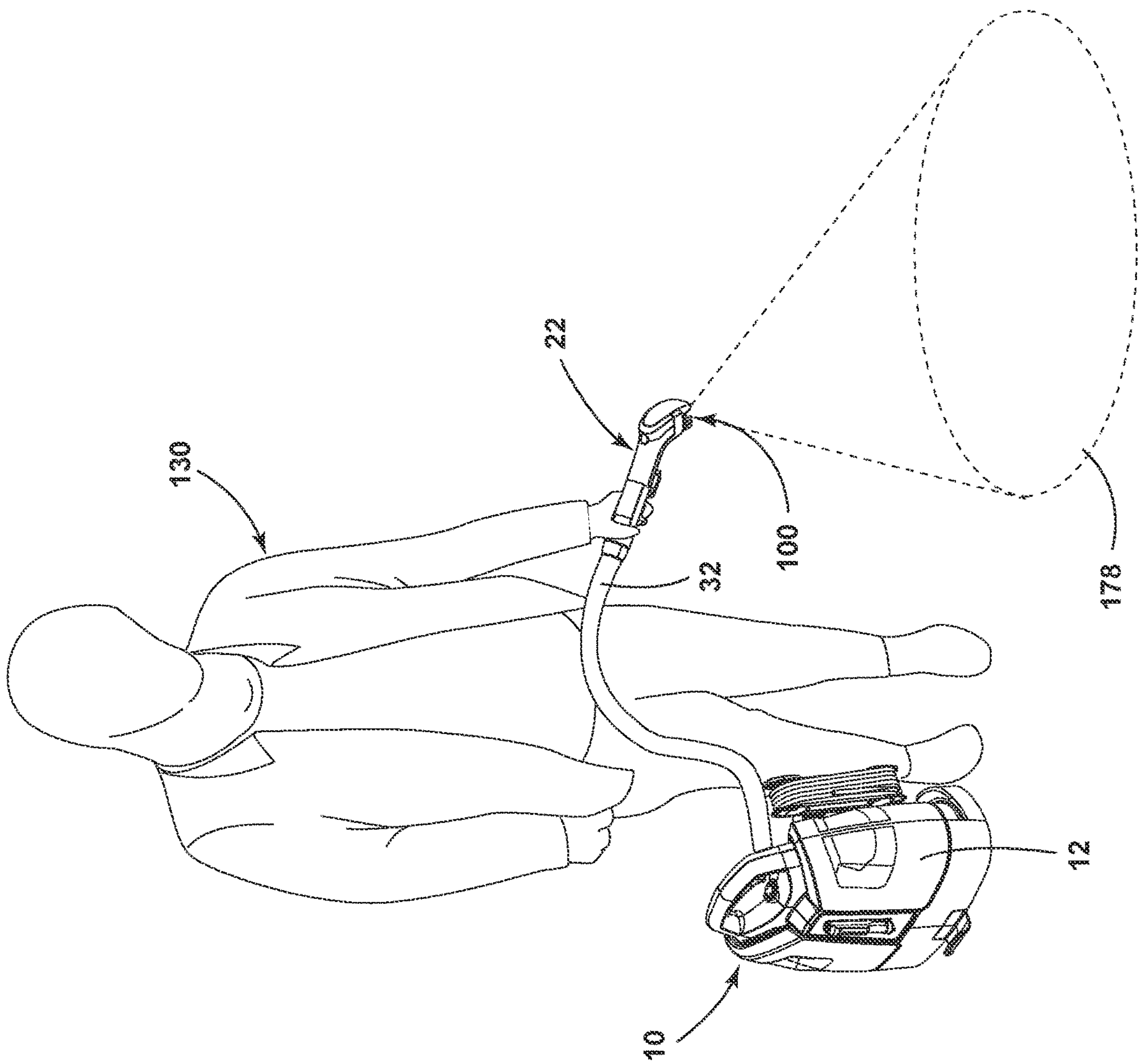
FIG. 15 shows a user holding the cleaning tool of the portable extraction cleaner from FIG. 12 and illuminating an area on a surface to be cleaned with the task lighting.
Figure 16:
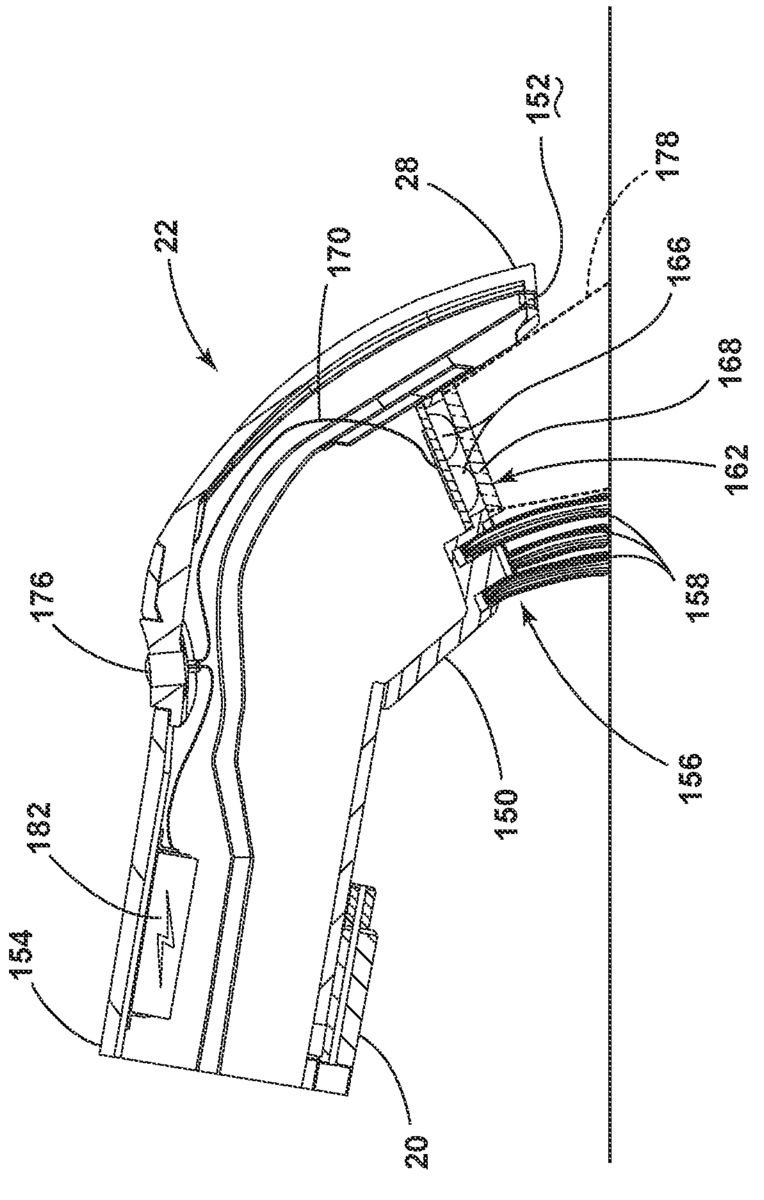
FIG. 16 is a cross-sectional view of a hand-held cleaning tool with task lighting according to a fourth embodiment of the invention.

FIG. 15 illustrates one manner in which the extraction cleaner 10 of the third embodiment may be used. FIG. 16 shows a user 130 pointing the hand-held tool 22 like a spotlight to locate spots, stains, or debris on a surface, while the main housing 12 is resting on the surface. Once an area to be cleaned is identified, the user 130 can clean the area with the hand-held tool 22, optionally with the task light 162 still illumining the area.

FIG. 16 shows another hand-held tool 22 according to a fourth embodiment of the invention, in which like elements are referred to with the same referenced numerals used for the third embodiment. In the fourth embodiment, the hand-held tool 22 comprises a battery 182 for powering the task light 162.

Figure 17:
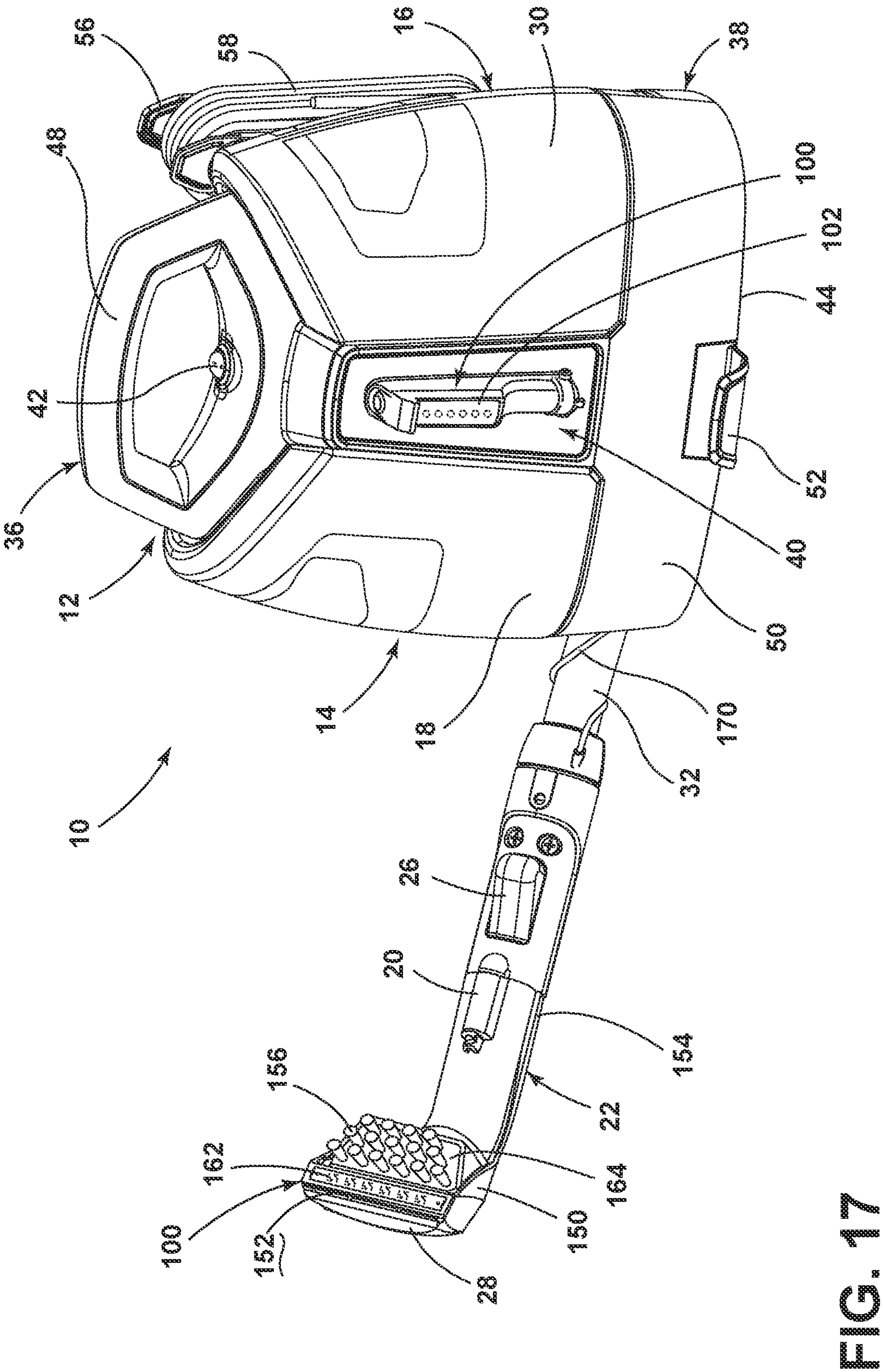
FIG. 17 is a front perspective view of a portable extraction cleaner with task lighting according to a fifth embodiment of the invention.

FIG. 17 shows a portable extraction cleaner 10 according to a fifth embodiment of the invention, in which like elements are referred to with the same referenced numerals used for the first embodiment. In the fifth embodiment, the task lighting 100 comprises multiple task lights on different locations on the extraction cleaner 10, including task light 102 provided on the main housing 12 and task light 162 provided on the hand-held tool 22. With multiple task lights, the user can select to one or both of the task lights 102, 162, and has more flexibility in choosing task lighting to match the cleaning task to be performed. For example, the user can carry the extraction cleaner 10 in one hand and shine the task light 102 around as a spotlight to locate spots, stains, or debris on a surface, and then rest the main housing 12 on the surface and use the hand-held task light 162 to illuminate the area while cleaning.

While shown on a portable device adapted to be hand carried by a user for cleaning relatively small areas, in other embodiments the functional systems of the surface cleaning apparatus with task lighting can be arranged into other configurations, such as an upright device having a base and an upright body for directing the base across the surface to be cleaned, a canister device having a cleaning implement connected to a wheeled base by a vacuum hose, or a commercial device. Any of the aforementioned cleaners can be adapted to include a flexible vacuum hose, which can form a portion of the working air conduit between a nozzle and the suction source.

While the device is illustrated as an extraction cleaner, in other embodiments the surface cleaning apparatus with task lighting can be may be applicable surface cleaning apparatus which have steam delivery capability, and/or surface cleaning apparatus which have fluid delivery but not extraction capabilities, or vice versa.

To the extent not already described, the different features and structures of the various embodiments of the present disclosure may be used in combination with each other as desired. Thus, the various features of the different embodiments may be mixed and matched as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A surface cleaning apparatus configured to deliver cleaning fluid to a surface to be cleaned and extract cleaning fluid from the surface, the apparatus comprising:

a hand-carried body adapted to be hand carried by a user, the hand-carried body comprising:

a main housing;

a motor/fan assembly mounted within the main housing;

a supply tank disposed on the main housing; and a recovery tank disposed on the main housing;

a flexible hose mounted to the hand-carried body and comprising a first conduit in fluid communication with the supply tank and a second conduit in fluid communication with the recovery tank;

a cleaning tool at an end of the hose; and a task light on the hand-carried body, the task light emitting visible light outwardly from the hand-carried body toward a location adjacent to the hand-carried body;

a power source;

a main power switch configured to control a supply of power from the power source to the motor/fan assembly; and a task light power switch configured to control a supply of power from the power source to the task light;

wherein the task light is pivotable between a stored position in which the task light is retracted against the hand-carried body and an angled position in which the task light is extended away from the hand-carried body to angle the task light outwardly from the main housing, whereby in the angled position, light emitted from the task light is directed at a downward angle, outwardly from the hand-carried body;

wherein the task light is automatically turned on by movement to the angled position and automatically turned off by movement to the stored position.

2. The surface cleaning apparatus of claim 1, wherein the hand-carried body comprises:

a main housing comprising a base adapted to rest directly on a floor surface; and a partition extending upwardly from the base;

wherein the motor/fan assembly is enclosed within the partition; and wherein the task light is provided on an exterior of the partition.

3. The surface cleaning apparatus of claim 2, wherein the supply tank is removably mounted to the main housing on a first side of the partition and the recovery tank is removably mounted to the main housing on a second side of the partition, wherein the task light is provided on the partition between the supply and recovery tanks.

4. The surface cleaning apparatus of claim 2, comprising a carry handle on an upper portion of the partition, wherein the motor/fan assembly and the task light are positioned below the carry handle.

5. The surface cleaning apparatus of claim 4, comprising:

a partition plane extending through a center of the partition and generally dividing the hand-carried body into two halves, with the supply and recovery tanks provided on opposing sides of the partition plane, wherein the partition plane bisects the carry handle; and a handle plane extending through a center of the carry handle, orthogonally to the partition plane;

wherein the task light is disposed on one side of the handle plane and is intersected by the partition plane.

6. The surface cleaning apparatus of claim 1, comprising a carry handle on the main housing of the hand-carried body, wherein the task light is provided on an exterior of the main housing below the carry handle.

7. The surface cleaning apparatus of claim 1, wherein the task light comprises:

a casing, and at least one light source enclosed within the casing behind a cover that is one of transparent and translucent.

8. The surface cleaning apparatus of claim 7, wherein the at least one light source comprises an array of LEDs disposed in a column in the casing.

9. The surface cleaning apparatus of claim 1, wherein the main power switch is on the hand-carried body.

10. The surface cleaning apparatus of claim 9, wherein the task light power switch is on the task light.

11. A surface cleaning apparatus configured to deliver cleaning fluid to a surface to be cleaned and extract cleaning fluid from the surface, the apparatus comprising:

a hand-carried body adapted to be hand carried by a user, the hand-carried body comprising:

a main housing;

a motor/fan assembly mounted within the main housing;

a supply tank disposed on the main housing; and a recovery tank disposed on the main housing;

a flexible hose mounted to the hand-carried body and comprising a first conduit in fluid communication with the supply tank and a second conduit in fluid communication with the recovery tank;

a cleaning tool at an end of the hose; and a task light on the hand-carried body, the task light emitting visible light outwardly from the hand-carried body toward a location adjacent to the hand-carried body;

a power source;

a main power switch configured to control a supply of power from the power source to the motor/fan assembly; and a task light power switch configured to control a supply of power from the power source to the task light;

wherein the task light comprises a snake light comprising a flexible arm coupled with the hand-carried body at a proximal end thereof and at least one light source supported at a distal end of the flexible arm.

12. The surface cleaning apparatus of claim 1 comprising a second task light on the cleaning tool, the second task light emitting visible light outwardly from the cleaning tool toward the surface to be cleaned.

13. A surface cleaning apparatus configured to deliver cleaning fluid to a surface to be cleaned and extract cleaning fluid from the surface, the apparatus comprising:

a hand-carried body adapted to be hand carried by a user, the hand-carried body comprising:

a main housing;

a motor/fan assembly mounted within the main housing;

a supply tank disposed on the main housing; and a recovery tank disposed on the main housing;

a flexible hose mounted to the hand-carried body and comprising a first conduit in fluid communication with the supply tank and a second conduit in fluid communication with the recovery tank;

a cleaning tool at an end of the flexible hose;

a task light on the hand-carried body, wherein the task light is pivotable between:

a stored position in which the task light is retracted against the hand-carried body; and an angled position in which the task light is extended away from the hand-carried body to angle the task light outwardly from the main housing; and a task light power switch actuated based on the position of the task light, wherein the task light is automatically turned on by movement to the angled position and automatically turned off by movement to the stored position.

14. The surface cleaning apparatus of claim 13, comprising a carry handle on the main housing of the hand-carried body, wherein the task light is provided on an exterior of the main housing below the carry handle.

15. A surface cleaning apparatus configured to deliver cleaning fluid to a surface to be cleaned and extract cleaning fluid from the surface, the apparatus comprising:

a hand-carried body adapted to be hand carried by a user, the hand-carried body comprising:

a main housing;

a motor/fan assembly mounted within the main housing;

a supply tank disposed on the main housing; and a recovery tank disposed on the main housing;

a flexible hose mounted to the hand-carried body and comprising a first conduit in fluid communication with the supply tank and a second conduit in fluid communication with the recovery tank;

a cleaning tool at an end of the flexible hose; and a task light on the hand-carried body, wherein the task light comprises:

a casing, and at least one light source enclosed within the casing behind a cover that is one of transparent and translucent, wherein the casing has a first end containing the at least one light source and a second end pivotably coupled to the main housing by a hinge, and the task light is pivotable about an axis defined by the hinge.

16. The surface cleaning apparatus of claim 15, comprising a tether attached between the main housing and the casing, the tether supporting the casing in an angled position in which the second end of the casing is spaced away from the main housing and the first end of the casing remains close to the main housing by the attachment of the hinge.

17. The surface cleaning apparatus of claim 13, wherein the hand-carried body comprises:

a main housing comprising a base adapted to rest directly on a floor surface; and a partition extending upwardly from the base;

wherein the motor/fan assembly is enclosed within the partition; and wherein the task light is provided on an exterior of the partition.

18. The surface cleaning apparatus of claim 17, wherein the supply tank is removably mounted to the main housing on a first side of the partition and the recovery tank is removably mounted to the main housing on a second side of the partition, wherein the task light is provided on the partition between the supply and recovery tanks.

19. The surface cleaning apparatus of claim 18, comprising:

a partition plane extending through a center of the partition and generally dividing the hand-carried body into two halves, with the supply and recovery tanks provided on opposing sides of the partition plane; and wherein the task light is intersected by the partition plane.

20. The surface cleaning apparatus of claim 13, wherein the task light comprises:

a casing, and at least one light source enclosed within the casing behind a cover that is one of transparent and translucent.

* * * * *